(12) United States Patent
Cakmak et al.

(10) Patent No.: US 7,714,054 B2
(45) Date of Patent: May 11, 2010

(54) PROCESS FOR MAKING STRAIN-HARDENED POLYMER PRODUCTS

(75) Inventors: Mukerrem Cakmak, Munroe Falls, OH (US); Jake H. Mulligan, Eagan, MN (US)

(73) Assignee: The University of Akron, Akron, OH (US)

( * ) Notice: Subject to any disclaimer, the term of this patent is extended or adjusted under 35 U.S.C. 154(b) by 133 days.

(21) Appl. No.: 10/692,584

(22) Filed: Oct. 24, 2003

(65) Prior Publication Data
US 2004/0176513 A1    Sep. 9, 2004

(51) Int. Cl.
C08K 3/34     (2006.01)
C08L 67/04    (2006.01)
B29C 55/00    (2006.01)

(52) U.S. Cl. ........................ 524/445; 524/577; 525/419; 264/291; 264/164

(58) Field of Classification Search ................ 524/445, 524/495, 430, 570, 584, 577; 428/910, 332; 525/419; 264/291
See application file for complete search history.

(56) References Cited

U.S. PATENT DOCUMENTS

| | | | | |
|---|---|---|---|---|
| 3,773,609 A | * | 11/1973 | Haruta et al. | 428/516 |
| 3,903,234 A | * | 9/1975 | Ikeda et al. | 264/154 |
| 4,725,472 A | * | 2/1988 | Okabe et al. | 428/141 |
| 5,180,626 A | * | 1/1993 | Ishibashi et al. | 428/213 |
| 5,248,720 A | * | 9/1993 | Deguchi et al. | 524/444 |
| 5,536,807 A | * | 7/1996 | Gruber et al. | 528/354 |
| 6,139,948 A | * | 10/2000 | Kobayashi et al. | 428/331 |
| 6,267,011 B1 | | 7/2001 | Kurtz et al. | 73/789 |
| 6,407,155 B1 | * | 6/2002 | Qian et al. | 524/445 |

FOREIGN PATENT DOCUMENTS

JP    2002-363393 A  * 12/2002
WO   WO 00/47657        8/2000

OTHER PUBLICATIONS

JP 2002-363393 (Yamada et al.) Dec. 18, 2002, translation in English.*
"The Effect of Titanium Dioxide Particles on the Deformation Behavior and Orientation Development in PET Films", Atsushi Taniguchi and Miko Cakmak, Annual Technical Conference-Society of Plastics Engineers (2000), 58$^{th}$ (vol. 2), 1786-1790.
"Effect of Biaxial Stretching on Thickness Uniformity and Surface Roughness of PET and PPS Films", K. Iwakura, Y.D. Wang, and M. Cakmak, Int. Polym. Process (1992), 7 (4), 327-333.
"Real Time Birefringence Development of Orientation in Polymers During Uniaxial Stretching as Detected by Robust Spectral Birefringence Technique", S. Toki, D. Valladares, T.Z. Sen, and M. Cakmak, Annual Technical Conference-Society of Technical Engineers (2001), 59$^{th}$ (vol. 2), 1830-1837.

* cited by examiner

Primary Examiner—David Wu
Assistant Examiner—Rip A. Lee
(74) Attorney, Agent, or Firm—Roetzel & Andress, LPA; Joseph J. Crimaldi (57) ABSTRACT

A process which subjects a body of polymer to deformation to produce strain hardened polymeric products including blending a polymer and a nanoparticle material to produce a polymeric composition, forming a film from the polymeric composition, and subjecting the composition to strain hardening. The resulting product has improved clarity, dimensional stability, uniform thickness, due to the "self-leveling" properties of the polymeric composition.

6 Claims, 12 Drawing Sheets

PROCESS FOR MAKING STRAIN-HARDENED POLYMER PRODUCTS

BACKGROUND OF THE INVENTION

The present invention is related to a process for making strain-hardened polymer products using polymer-nanoparticle compositions.

Strain hardening is the most important characteristic in the production and usability of polymeric films in such processes as Tenter frame biaxial film stretching, blow molding, film blowing, thermoforming, and the like. This property affects structural characteristics such as crystallization as well as thickness uniformity of polymers. It is at this point that many polymers are known to crystallize due to orientation from deformation, with a consequential affect on optical, physical and mechanical properties.

The reasoning for controlling strain hardening is due to its effect on structural development in materials. The net effect of this behavior translates into "self-leveling" that allows thinned portions of a material to sustain higher forces while transferring the deformation to other undeformed regions, resulting in achieving greater uniformity in the thickness of the products. For this reason, it is of critical importance to find an efficient means of selectively controlling the strain hardening behavior of polymers. As an example, in film production for such industries as information recording (audio and video cassettes, etc.), film uniformity and lack of surface roughness are of paramount importance for acceptable products.

There have been many attempts to control the strain hardening behavior of polymeric films through the addition of additives, by blending, or by co-polymerization. But, adding fillers does not necessarily improve mechanical and physical properties of polymers, and studies indicate that they may not have desired effect on the deformation behavior. For example, the work of Taniguchi et al (Atsushi Taniguchi and Miko Cakmak, "The effect of titanium dioxide particles on the deformation behavior and orientation development in PET films", Annual Technical Conference—Society of Plastics Engineers (2000), 58th (Vol. 2), 1786-1790) showed that adding submicron sized particles retards the strain hardening process to higher strain levels. Tanaguchi et al. reported that the effect of submicron size $TiO_2$ particles at varying concentrations on the stress-strain behavior of uniaxially deformed PET films from the amorphous state. The $TiO_2$ particles act as nucleation agents and enhance the thermally induced crystallization of PET. When stretched from the amorphous state, $TiO_2$ particles at concentrations as low as 0.35 percent reduce the overall stress and delay strain hardening, thereby hindering orientation induced crystallization. Consequently, films stretched under the same conditions, but containing higher levels of $TiO_2$ have both lower crystallinity and orientation. They attribute this behavior to the reductions in the number of chain entanglements due to the presence of small amounts of $TiO_2$ particles.

Iwakura, et al. (Iwakura, K.; Wang, Y. D.; and Cakmak, M., "Effect of biaxial stretching on thickness uniformity and surface roughness of PET and PPS films," Int. Polym. Process. (1992), 7(4), 327-333) in their publication performed biaxial film-stretching studies with poly(ethylene terephthalate) (PET) and poly(p-phenylene sulfide) (PPS) to observe the effects of stretching conditions on film properties; particularly surface smoothness and thickness uniformity. They found that by decreasing the stretching temperature and increasing the stretch ratio, they could improve these properties in PET, but not in PPS. They also observed that the most important factor in controlling these properties was the strain hardening mechanism. If this could be controlled, so too would the thickness uniformity and surface smoothness. Under the conditions used in these experiments, strain hardening occurred for PET, but not for PPS, and once strain hardening was attained, properties improved drastically, especially the thickness uniformity. They attributed the problems in PPS to branching of the polymer chains.

It would be a very easy to process films to have desirable properties if all that one had to do was find the strain hardening point, and just stretch beyond this. However, this is not always possible. Sometimes the strain hardening point occurs at too high of a strain to be feasible, or in some other cases, strain hardening is just not possible under normal processing conditions. In addition, there are other side issues in processing and properties. Characteristics, such as miscibility and domain size, have great effect on polymer properties. In the instance where strain hardening can be improved, other properties may suffer. A modification that works very well in one case can yield a very poor result in another, or too much modification may actually be detrimental to some properties. In other cases, a modification may work very well, but the strain hardening behavior still might not be very well controlled, as the modification might work only to a certain extent.

SUMMARY OF INVENTION

The present invention is the result of the discovery that a way to control the strain hardening behavior of polymer films during stretching from their rubbery state temperature range from their amorphous precursors through the inclusion of small fraction of nano sized particles. This discovery specifically provides a new highly controllable "tool" to achieve a deformation behavior of the polymeric materials, wherein the strain hardening behavior can be adjusted to occur at different desired strain levels thereby causing the films to "self level" for different product geometries without having to change the processing temperature and processing stretching rates.

There are also additional advantages to these polymer-nano particle composites. Among these include increased heat distortion temperature, modulus, gas barrier properties. In addition at the small concentration levels used in the composition, the films remain transparent in the visible wavelength range. The latter is very important in applications where the product appearance is important (e.g., beverage containers, transparencies, etc.).

It is therefore, an object of the present invention to provide a method to control the strain hardening behavior of polymer films using nanometer scale particles.

At least one or more of the foregoing objects, together with the advantages thereof over the known art relating to polymer films, which shall become apparent from the specification which follows, are accomplished by the invention as hereinafter described and claimed

DETAILED DESCRIPTION AND PREFERRED EMBODIMENT FOR CARRYING OUT THE INVENTION

The present invention is directed to a process which subjects a body of polymer to deformation to produce strain hardened polymeric products. By adding nanoparticles to the polymers, when the polymer composition is subjected to deformation, novel strain hardening characteristics are imparted to cast films. This is applicable to a wide variety of film forming materials including, but not limited, to homopolymers and copolymers of polyolefins, polyamides, polyimides, polyesters, aliphatic polymers, amorphous polymers, slow crystallizing polymers, fast crystallizing polymers, and blends, alloys and combinations of the same. Depending upon the polymer, the effect on strain hardening is always present, but in varying degrees. In fast crystallizing polymer the strain hardening can be achieved when the polymer is either partially molten or completely molten.

Nanoparticles would include particles of a nanoscale, i.e., 400 to 700 nanometers, with at least one dimension in the nanoscale, including spheres, particles of irregular geometry, sheets and foils, and fibers, wires and tubes, such as:

Carbon nanoparticles (graphite, nanotubes, spherical particles such as Bucky Balls, and the like)
  Glassy nanoparticles, including but not limited to silica-based nanoparticles
  All varieties of nanoclays, with substituted Montmorillonite being preferred
  Metal oxide, metal sulfides, metal nitrides, and other such ionic nanoparticles
  Metal complex nanoparticles
  Metallic and metallic alloy nanoparticles (nanowires, nanospheres, nano-sized sheets and foils)
  Colloidal nanoparticles The amount of nanoparticles will vary depending upon the polymer employed and the characteristics of the polymer product, but will vary between 0.01 percent by volume up to 10 percent by volume, with the range of 0.1 percent to 10 percent by volume nanoparticle loading being preferred, and the range of 1 percent to 10 percent by volume being also preferred. Usually the least amount of nanoparticle to be effective will be selected, since the additional material only increases material costs. But, there may be instances where higher loadings are desirable due to the final properties of the final polymeric product. Further, since at increased loadings, the strain hardening point continues to shift to lower true strains, by varying the nanoparticle concentration one can "dial-in" the strain hardening point for a specific process.

The polymeric products can be two dimensional, such as films, or three dimensional, such as bottles or other shapes.

To produce the polymeric products, the polymer and nanoparticles are blended together to form a nanocomposite which is subsequently further treated. But, there are several means of making the nanocomposite, including swelling followed by polymerization (i.e., mixing the nanoparticles with the chemicals before the polymer is made), rubbery state blending, melt compounding (where the polymer is completely melted), and the like. This part of the process is not critical. Mixing can be performed in chemical reactors (in polymerization for example), internal mixers, continuous mixers, calendars, extruders with various screw types, configurations, and various numbers of screws, including single, twin, and/or multiscrew mixers, extruders incorporating mixing elements in their screw designs, and any other similar mixing instruments. The operating conditions vary depending upon the polymer and/or nanoparticles employed. Temperatures range from very low, including below zero in some cases of polymerization, up to very high, including more than 400 C in the case of some high temperature polymers where blending occurs in the melt.

When the polymeric materials are used to make films, they can be extrusion-cast, compression-molded or blown. Thereafter, the polymers are quenched to low temperatures (below the glass transition for polymers that can be quenched into the amorphous state), then the temperature is raised to a desired stretching temperature. Under these conditions the polymer can be stretched to yield high orientation and strength.

Thus, strain-hardened or strain-hardening would include or apply to products subjected to deformation in order to secure the specified physical characteristics such as orientation and crystallinity. This could also be defined as the point at which there is a sudden upturn in the true stress-true strain curve for the composition. This is illustrated in the figures which are part of the present disclosure. These processes include, but are not limited to thermoforming, bottle blowing, stretch bottle blowing, film casting, uniaxial and multi-axial stretching, and various other stretching or film blowing processes.

When the polymeric products are made from a slow crystallizing polymer, such as poly(lactic acid) (PLA), polyetheylene terephthalate (PET), poly(p-phenylene sulfide) (PPS), or poly(ethylene-2,6-naphthalate) (PEN), during film casting, the polymer exits the die as a molten sheet and is quenched below it's glass transition, so that the material possesses little or no crystallinity. Then, the temperature of the material is raised to somewhere between the glass transition and cold crystallization temperature, which is called the rubbery state, and the polymer is stretched (uniaxially or multi-axially), so that the chains become oriented in the direction, due to the stretching. The polymer may strain harden, or strain induced crystallization will occur, and this may lead to strain hardening. Amorphous materials, including polystyrene and PMMA, remain essentially amorphous under all processing conditions, and strain harden due primarily to orientation. Highly crystalline polymers, including polyethylene and polypropylene, are highly crystalline under all processing conditions, so the nature of their deformation temperature is a little different. If they are melted, they will not hold up to stretching, so they are only partially melted. The remaining crystalline portion holds the material together while it is stretched, and the bulk of the deformation takes place in the molten amorphous portion. In each case strain hardening is important in controlling both the thickness and the uniformity of the thickness.

By controlling strain hardening through modifying the material, via the process of the present invention, the need for expensive and complicated modifications to capital equipment, or even the purchase of new capital equipment is eliminated, while the properties of the material are enhanced. This can result in the saving of a considerable amount of money.

EXAMPLES

Example 1

Atactic Polystyrene

Atactic polystyrene pellets were exposed to blending in a Brabendar mixer for ten minutes using banbury blades. Blending occurred at 200° C. with a rotor speed of 70 rpm. After the blending was complete, the melt was quenched in room temperature water, and was subsequently dried under vacuum. Film samples were compression molded at 200° C. for five minutes, and were then quenched in room temperature water. The resulting film was amorphous.

Example 2

Atactic Polystyrene with 1% by Volume Substituted Montmorillonite

Atactic polystyrene pellets were exposed to blending in a Brabendar mixer for two minutes using banbury rotors. Blending occurred at 200° C. with a rotor speed of 70 rpm. After two minutes had passed, 1% by volume of substituted Montmorillonite (Nanocor 134) was added to the mixer, and the polymer and clay were blended for eight minutes. After the blending was complete, the melt was quenched in room temperature water, and was subsequently dried under vacuum. Film samples were compression molded at 200° C. for five minutes, and were then quenched in room temperature water. The resulting film was amorphous.

Example 3

Atactic Polystyrene with 3% by Volume Substituted Montmorillonite

Atactic polystyrene pellets were exposed to blending in a Brabendar mixer for two minutes using sigma blades. Blending occurred at 200° C. with a rotor speed of 70 rpm. After two minutes had passed, 3% by volume of substituted Montmorillonite (Nanocor 134) was added to the mixer, and the polymer and clay were blended for eight minutes. After the blending was complete, the melt was quenched in room temperature water, and was subsequently dried under vacuum. Film samples were compression molded at 200° C. for five minutes, and were then quenched in room temperature water. The resulting film was amorphous.

Example 4

Polylactic Acid

Polylactic acid (Natureworks 4041D) pellets were exposed to blending in a counter-rotating twin screw extruder with two shearing elements and one backflow element. Blending occurred at 190° C. with a rotor speed of 190 rpm. The melt was quenched upon exit from the die in room temperature water, and was subsequently dried under vacuum. Film samples were compression molded at 190° C. for five minutes, and were then quenched in room temperature water. The resulting film was essentially amorphous.

Example 5

Polylactic Acid with 1% by Volume Substituted Montmorillonite

Polylactic acid (Natureworks 4041 D) was tumble mixed with 1% by volume of substituted Montmorillonite (Nanocor 134). The dry mixture was exposed to blending in a counter-rotating twin screw extruder with two shearing elements and one backflow element. Blending occurred at 190° C. with a rotor speed of 190 rpm. The melt was quenched upon exit from the die in room temperature water, and was subsequently dried under vacuum. Film samples were compression molded at 190° C. for five minutes, and were then quenched in room temperature water. The resulting film was essentially amorphous.

Example 6

Polylactic Acid with 3% by Volume Substituted Montmorillonite

Polylactic acid (Natureworks 4041D) was tumble mixed with 3% by volume of substituted Montmorillonite (Nanocor 134). The dry mixture was exposed to blending in a counter-rotating twin screw extruder with two shearing elements and one backflow element. Blending occurred at 190° C. with a rotor speed of 190 rpm. The melt was quenched upon exit from the die in room temperature water, and was subsequently dried under vacuum. Film samples were compression molded at 190° C. for five minutes, and were then quenched in room temperature water. The resulting film was essentially amorphous.

Example 7

Polylactic Acid with 5% by Volume Substituted Montmorillonite

Polylactic acid (Natureworks 4041D) was tumble mixed with 5% by volume of substituted Montmorillonite (Nanocor 134). The dry mixture was exposed to blending in a counter-rotating twin screw extruder with two shearing elements and one backflow element. Blending occurred at 190° C. with a rotor speed of 190 rpm. The melt was quenched upon exit from the die in room temperature water, and was subsequently dried under vacuum. Film samples were compression molded at 190° C. for five minutes, and were then quenched in room temperature water. The resulting film was essentially amorphous.

Example 8

Polylactic Acid with 10% by Volume Substituted Montmorillonite

Polylactic acid (Natureworks 4041 D) was tumble mixed with 10% by volume of substituted Montmorillonite (Nanocor 134). The dry mixture was exposed to blending in a counter-rotating twin screw extruder with two shearing elements and one backflow element. Blending occurred at 190° C. with a rotor speed of 190 rpm. The melt was quenched upon exit from the die in room temperature water, and was subsequently dried under vacuum. Film samples were compression molded at 190° C. for five minutes, and were then quenched in room temperature water. The resulting film was essentially amorphous.

Example 9

Extrusion-Cast Polylactic Acid Films

Polylactic acid (Natureworks 4041D) was exposed to blending in a counter-rotating twin screw extruder with two shearing elements and one backflow element. Blending occurred at 190° C. with a rotor speed of 190 rpm. The melt was quenched upon exit from the die in room temperature water, and was subsequently dried under vacuum. The processed pellets were fed into a 1½ inch single screw extruder, were processed at 190° C., and were cast into film onto a chill roll kept at 36° C. that was 1 cm away from the die exit. The resulting film was essentially amorphous with zero orientation.

Example 10

Extrusion-Cast Films of Polylactic Acid with 3% by Volume Substituted Montmorillonite Polylactic acid (Natureworks 4041 D) was tumble mixed with 3% by volume of substituted Montmorillonite (Nanocor 134). The dry blend was exposed to blending in a counter-rotating twin screw extruder with two shearing elements and one backflow element. Blending occurred at 190° C. with a rotor speed of 190 rpm. The melt was quenched upon exit from the die in room temperature water, and was subsequently dried under vacuum. The processed pellets were fed into a 1½ inch single screw extruder, were processed at 190° C., and were cast into film onto a chill roll kept at 36° C. that was 1 cm away from the die exit. The resulting film was essentially amorphous with zero orientation.

Film samples were cut into dumbbell shapes with width 46 mm, length 36 mm, and thicknesses of approximately 0.5 mm. Cutting was performed around a sample mold with a rotary blade at high speed to ensure integrity of the sample edges. The machine used to follow the on-line true mechano-optical behavior is described in greater detail in Toki, et al. (Toki, S., Valladares, D., Sen, T. Z., and Cakmak, M. "Real time birefringence development of orientation in polymers during uniaxial stretching as detected by robust spectral birefringence technique" Annual Technical Conference—Society of Plastics Engineers (2001), 59th (Vol. 2), 1830-1834). The films was stretched to stretch ratios up to 5 at various rates from 5%/min up to 3000%/min at 75, 85, and 95° C. for PLA and 105, 115, and 125° C. for PS.

Figure 1:
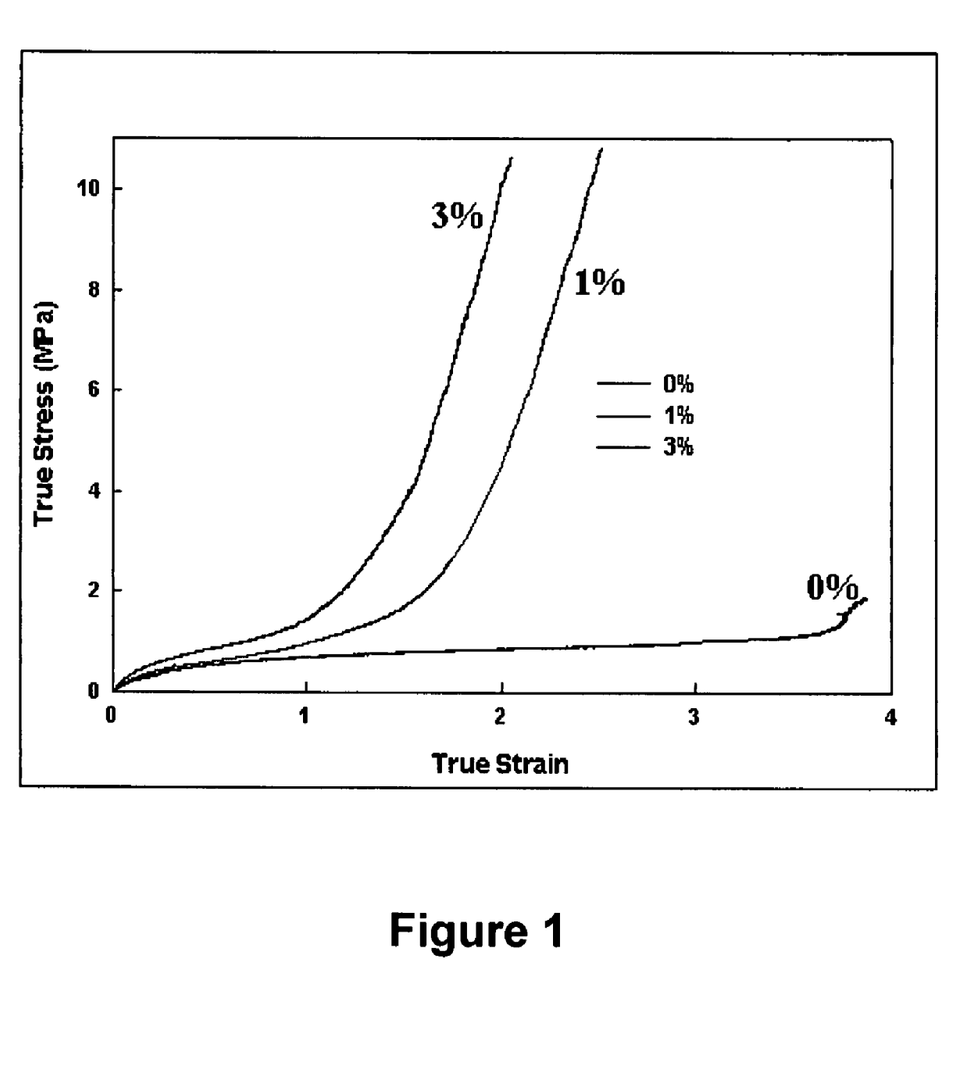
FIG. 1 is a graph of the True Stress versus True Strain of compression-molded poly(L-lactic acid) films having Montmorillonite clay loadings of 0, 1 and 3% by volume and stretched at 75° C. and at 5% per minute.

FIG. 1 shows the true stress—true strain behavior for compression molded PLA poly(lactic acid) stretched uniaxially to SR 5 at 75° C. and 5%/min at clay loadings of 0, 1, and 3%. PLA with 0% clay loading does not reach the strain hardening point until near the very end of the deformation, and reaches a true strain value of nearly 4. This is almost like a taffy-pull behavior in which the bulk is deformed at such a low rate that the chains orient and relax at about the same rate, leading to a high degree of thinning of the bulk at the center-point where the measurements are made. However, with the addition of clay, the deformation behavior changes significantly, leading to strain hardening at much lower true strains, around 1.5 for PLA with 1% clay loading and 1 for 3% clay loading. It is believed that the clay sheets act as infinitely long, stiff chains, feeling the force more than the surrounding bulk, and orienting in the direction of deformation much more easily. Due to their rigidity, the clay sheets cannot relax as the polymer chains do, and they hold their orientation during deformation. Here, orientation is taking place in the absence of relaxation. The polymer chains entangle on and around the clay sheets will not be allowed to relax, as the clay cannot relax, and the polymer chains that have a hydrogen bonding interaction with the clay sheets will also orient in the direction of deformation without relaxing. In the absence of the relaxation mechanism, it is clear that strain hardening will take place at lower true strains. This preserves the width at the center of the sample, while creating more even deformation and properties in the material.

Figure 2:
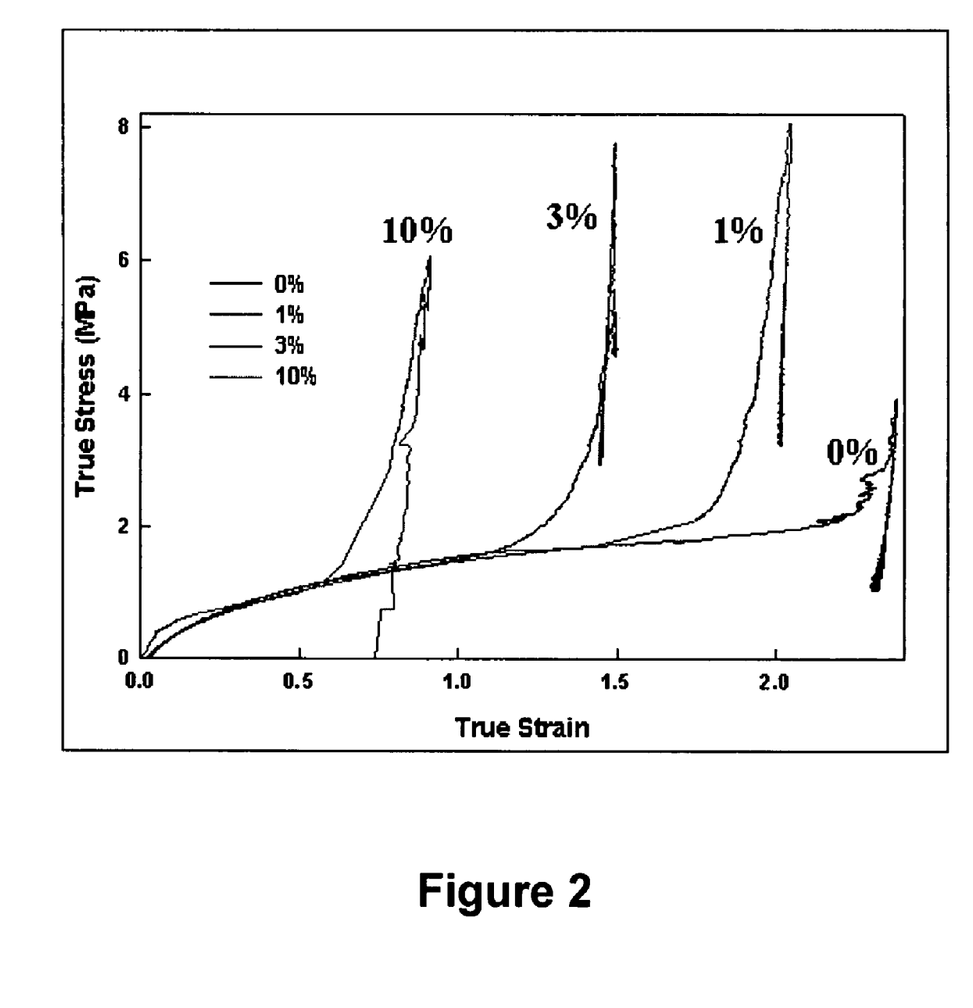
FIG. 2 is a graph of the True Stress versus True Strain of compression-molded poly(L-lactic acid) films having Montmorillonite clay loadings of 0, 1, 3 and 10% by volume and stretched at 75° C. and at 50% per minute, then held in constrained length at 75° C. for 30 minutes.

FIG. 2 shows the true stress—true strain behavior for PLA blended with clay loadings of 0, 1, 3, and 10% by volume, stretched at 50%/min at 75° C. to SR 5 and then held in constrained engineering strain for 30 minutes at the stretching temperature. These results clearly illustrate the same general pattern of the results for the same films stretched at 5%/min (with the exception of 10% clay loading, which was difficult to stretch due to its extreme brittleness). In this case, the film is stretched at such a rate that strain hardening clearly occurs at 0% loading; however, strain hardening again occurs at lower true strains as clay content is increased. Under these stretching conditions, strain hardening occurs at a true strain of approximately 2 for 0% loaded material, and at 1.5 for 1% loading, 1 for 3% loading, and 0.5 for 10% loading. During constrained holding at 75° C. in length, true strain clearly relaxes in pure PLA film; however, the samples hold their final shape in films with clay loading, and true strain does not relax.

Figure 3:
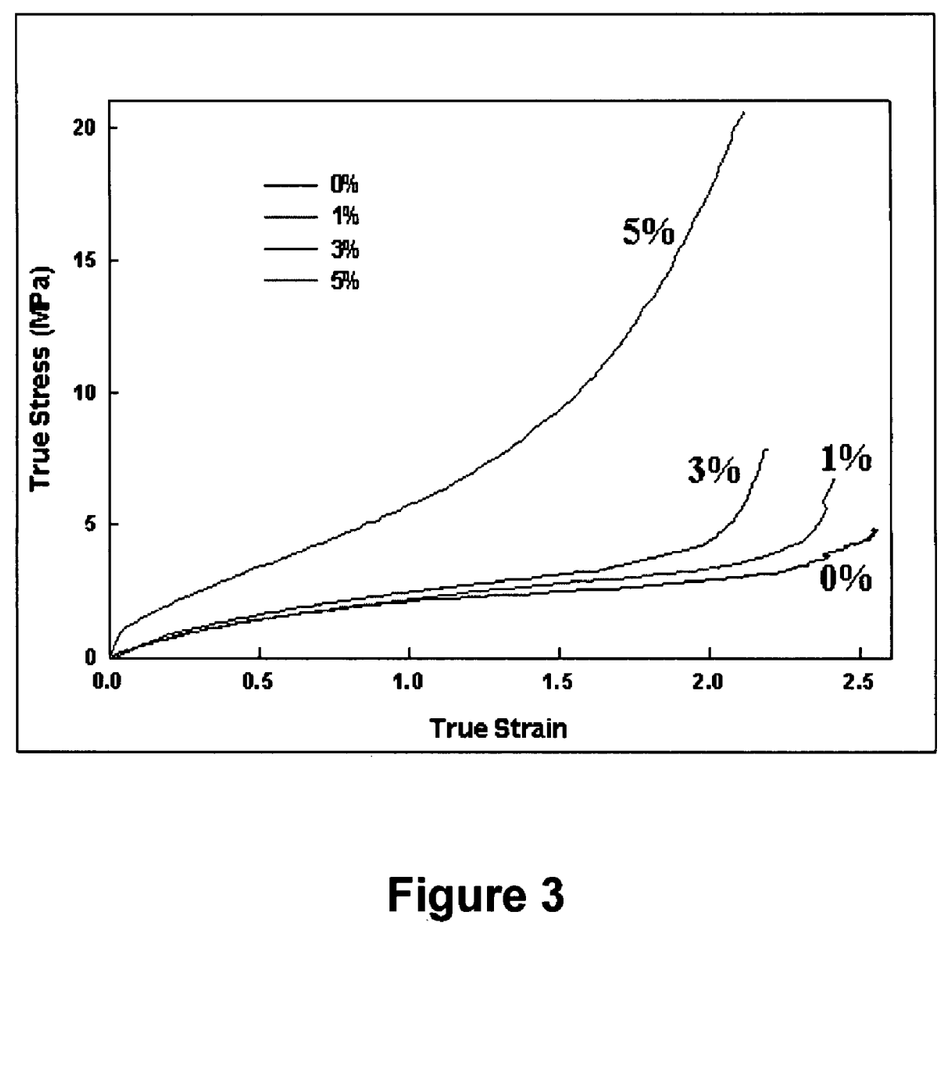
FIG. 3 is a graph of the True Stress versus True Strain of compression-molded poly(L-lactic acid) films having Montmorillonite clay loadings of 0, 1, 3 and 5% by volume and stretched at 75° C. and at 500% per minute.

FIG. 3 shows the plots of true mechanical behavior for PLA at clay loadings of 0, 1, 3, and 5% stretched at a rate of 500%/min and 75° C. to SR 5. Under these stretching conditions PLA loaded with nanoparticles strain hardens at a higher true strain that at lower rates, yet the trend that strain hardening occurs at lower true strains with increasing clay content continues to hold, with PLA with 0% clay loading strain hardening at a true strain of approximately 1.75, 1% loaded material at 1.65, 3% at 1.1, and 5% at 1. As for films stretched at 75° C. and 50%/min, films with higher clay loadings stretched at 500%/min and 75° C. retain their final as-stretched shape to a higher degree with less relaxation of true strain.

Figure 4:
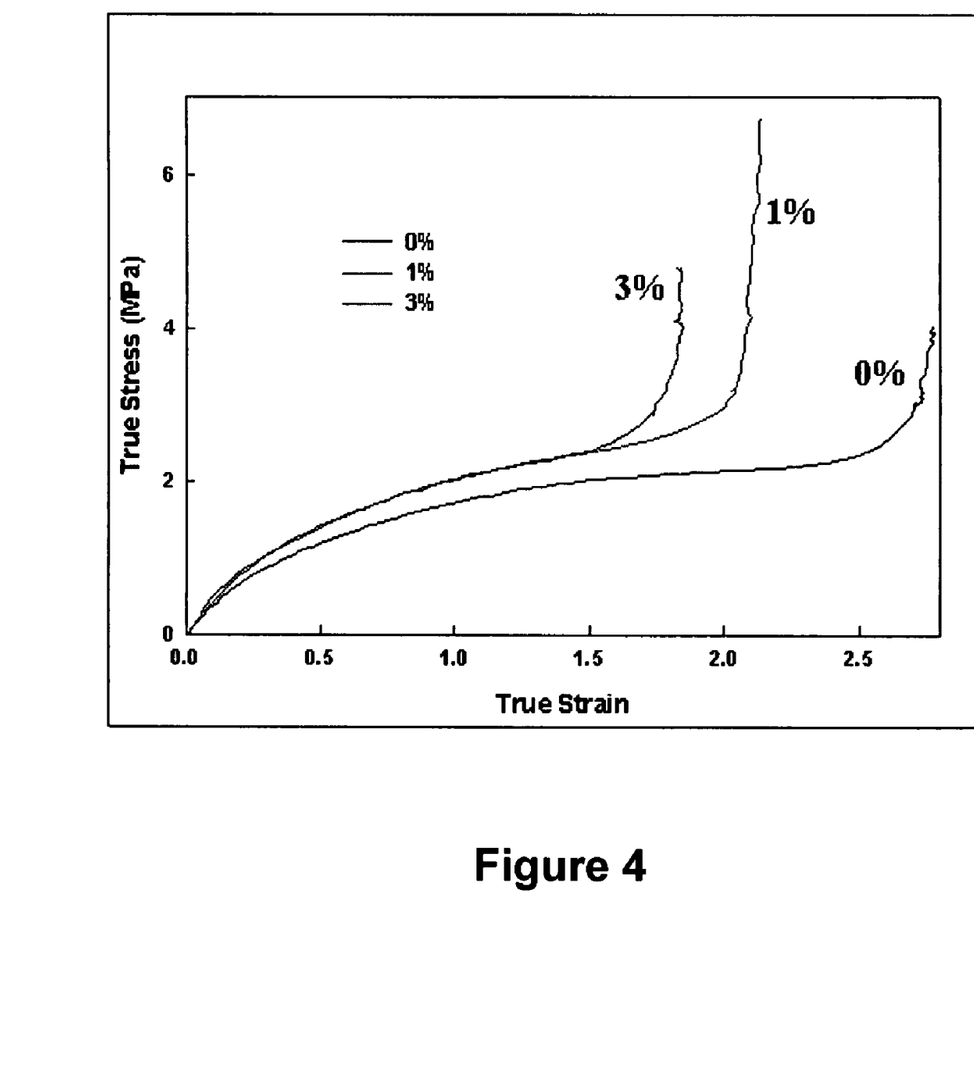
FIG. 4 is a graph of the True Stress versus True Strain of compression-molded poly(L-lactic acid) films having Montmorillonite clay loadings of 0, 1 and 3% by volume and stretched at 85° C. and at 500% per minute.

The true mechanical behavior of PLA films with clay loadings of 0, 1, and 3%, stretched at 85° C. and 500%/min to SR 5 is shown in FIG. 4. Once again, strain hardening occurs at lower true strains with increased clay loading. However, the effect of nanoparticles is significantly greater at 85° C. than at 75° C. This is similar to what was seen in the rate effect, with nanoparticle loading having a greater influence during lower rate stretching.

Figure 5:
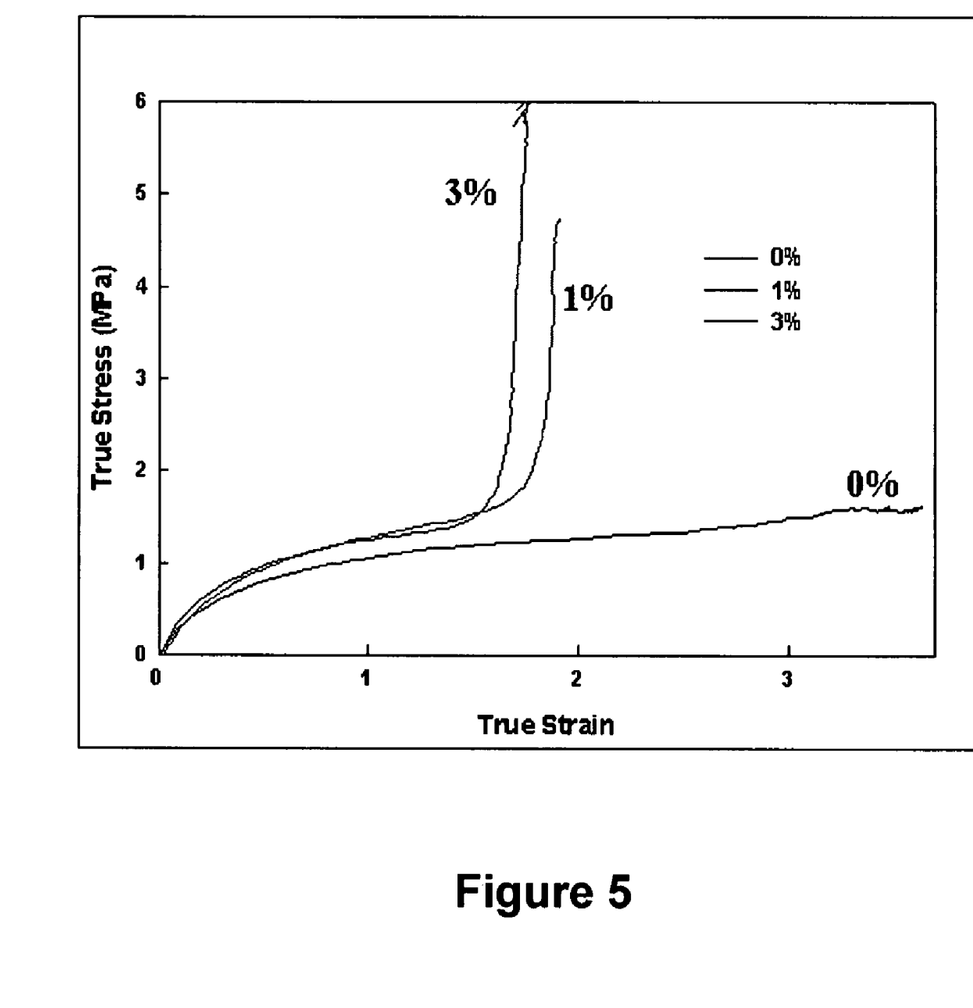
FIG. 5 is a graph of the True Stress versus True Strain of compression-molded poly(L-lactic acid) films having Montmorillonite clay loadings of 0, 1 and 3% by volume and stretched at 95° C. and at 500% per minute.

FIG. 5 shows the true stress—true strain plots for PLA films loaded with 0, 1, and 3% nanoclay, stretched at 500%/min and 95° C. to SR 5. Under these conditions, a taffy-pull behavior is strikingly present in the unfilled system. This stretching condition most clearly illustrates the importance of nanoparticle loading in controlling strain hardening in polymer systems, as strain hardening occurs at true strains less than or equal to 1.5 at a clay loading as small as 1% by volume. The ultimate true strains are 1.9 for 1% clay loading and 1.75 for 3%, while the unfilled system thins to a true strain approaching 4. There is a very slight upturn from the rubbery plateau in the unfilled system at a true strain of approximately 3; however, this flattens out.

Figure 6:
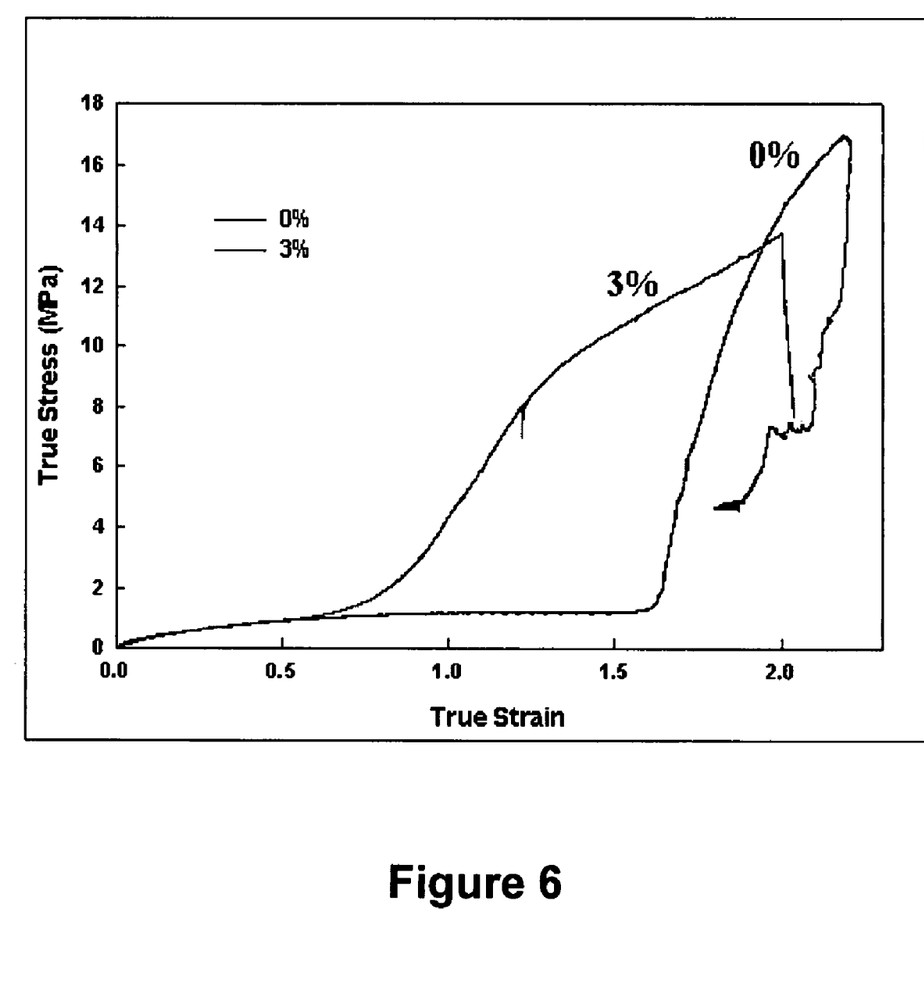
FIG. 6 is a graph of the True Stress versus True Strain of extrusion-cast poly(L-lactic acid) films having Montmorillonite clay loadings of 0 and 3% by volume and stretched at 75° C. and at 5% per minute.
Figure 7:
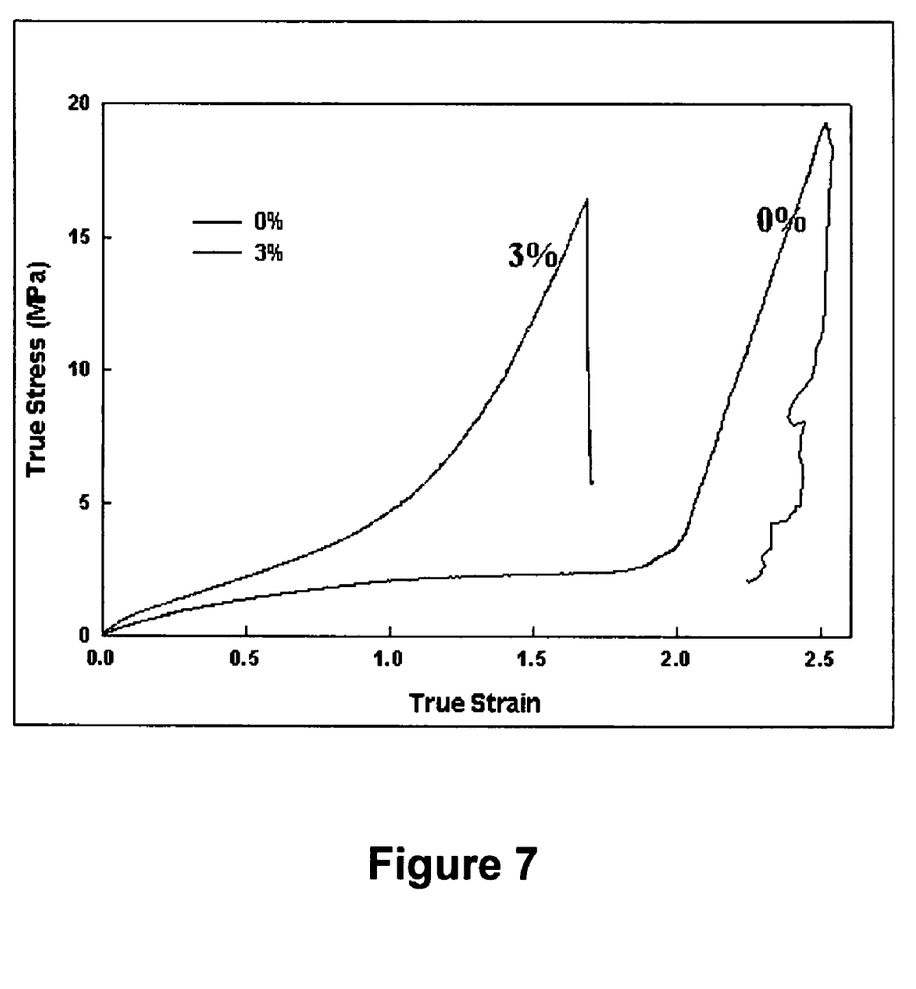
FIG. 7 is a graph of the True Stress versus True Strain of extrusion-cast poly(L-lactic acid) films having Montmorillonite clay loadings of 0 and 3% by volume and stretched at 75° C. and at 50% per minute.

FIG. 6 shows the true mechanical behavior of extrusion-cast films of PLA with clay loadings of 0 and 3% stretched to SR 5 at 5%/min and 75° C., then held in constrained length at 75° C. for one hour. Unlike the compression-molded unfilled PLA film, the extrusion-cast unfilled PLA film does not show behavior reminiscent of a taffy-pull, and strain harden at a true strain of approximately 1.7. However, the filled system also shows improved strain hardening properties in this case, with strain hardening occurring at 0.6 true strain. This is not only better than the unfilled system, but is 40% less than the corresponding compression-molded system. The likely cause of this difference is the higher orientation of the clay sheets in the as-cast extruded nanocomposite films in relation to the compression molded nanocomposite films. During the casting process, the clay sheets orient in the direction of the flow, and while the polymer chains relax to an unoriented state (the initial retardation of the film is zero), the clay sheets act as though they have an infinite relaxation time due to their high stiffness. When these films are subsequently stretched, the deformation is taking place between the clay sheets, around which polymer chains are entangled and hydrogen bonded. This leads to higher levels of stress, yet lower levels of birefringence, as some of the chains are locked in their place by the already oriented clay sheets. This behavior leads to the birefringence—true stress observations shown in FIG. 30. Unlike the results comparing compression-molded films, the Stress Optical Rule behavior is different between the filled and unfilled systems, with the filled system possessing a lower Stress Optical Constant. Also, the extrusion-cast nanocomposite shows earlier positive deviation from linearity. This positive deviation into the relatively low second regime slope does indicate that strain-induced crystallization is hindered in the nanocomposite to some degree, though. This result gives further credence to the effect of "pre-oriented" nanoclay sheets, in that the crystallization is likely taking place in regions between the clay sheets where the polymer chains may become highly oriented, as these are the areas that are likely sustaining the bulk of the deformation. The final level of birefringence is lower in the case of the nanocomposite because the "pre-oriented" nanoclay sheets block significant deformation on a global level, whereas the unfilled system is free of these constraints.

During holding, true strain in the unfilled system rebounds drastically, while some true strain continues to develop in the nanocomposite. This is seen in the stress—optical data as a slight decrease in birefringence during holding for the unfilled system, and continued development of birefringence in the nanocomposite. While the "pre-oriented" clay sheets hindered chain motion during deformation, they also hinder chain relaxation during holding. Holding at elevated temperature gives the chains time to crystallize from their limited orientation level, thereby resulting in continued development of birefringence and true strain.

Figure 8:
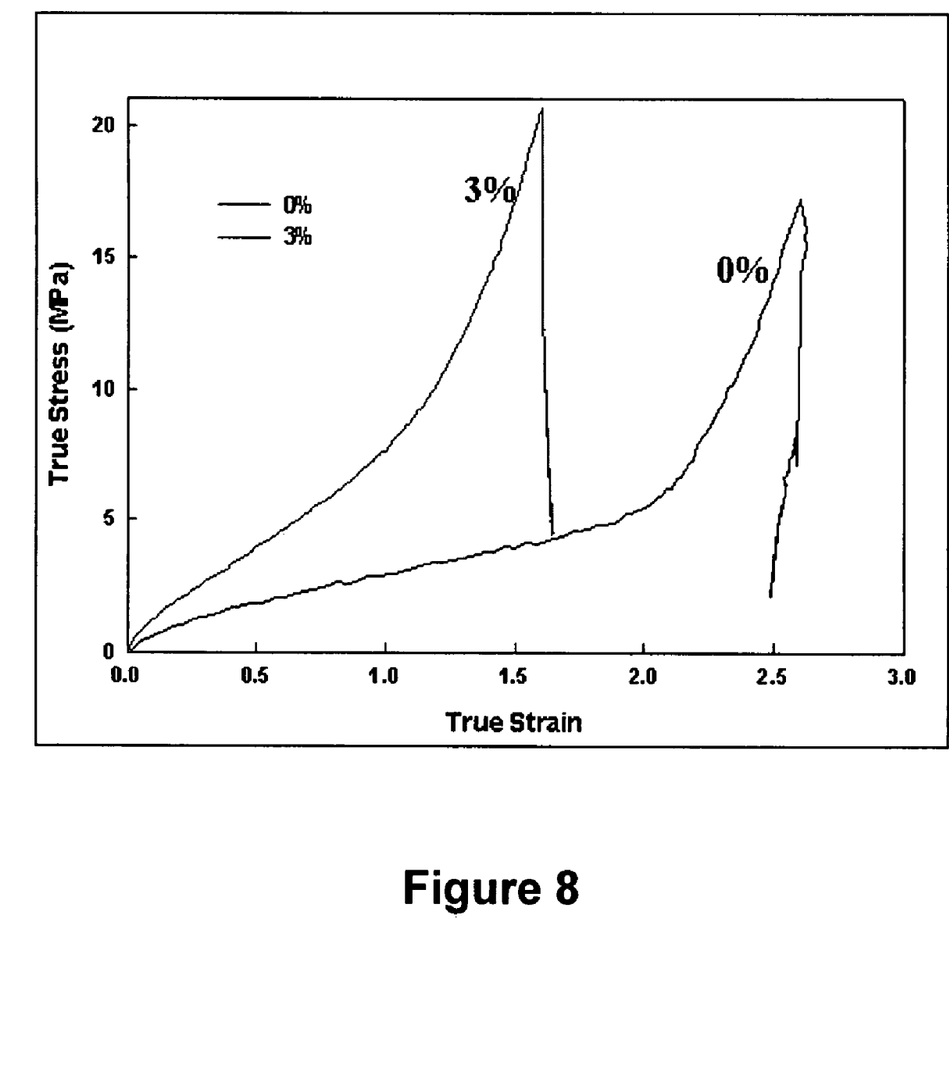
FIG. 8 is a graph of the True Stress versus True Strain of compression-molded poly(L-lactic acid) films having Montmorillonite clay loadings of 0 and 3% by volume and stretched at 75° C. and at 500% per minute.

In the birefringence—true stress behavior shown in FIG. 8, the nanocomposite film possesses a lower Stress Optical Constant than the unfilled PLA film. This is similar to what was seen in FIG. 30 for the same films stretched at a lower rate; however, the difference between the Stress Optical Constants is clearly greater during stretching at a higher rate. Only the slightest positive deviation from Stress Optical Rule linearity occurs in the nanocomposite film, showing again that strain-induced crystallization is hindered by the presence of nanoclay sheets. Again, during holding, there is a significant decrease in birefringence seen in the unfilled system, while the nanocomposite experiences significant continued birefringence development during the holding stage, most likely due to crystallization.

Figure 9:
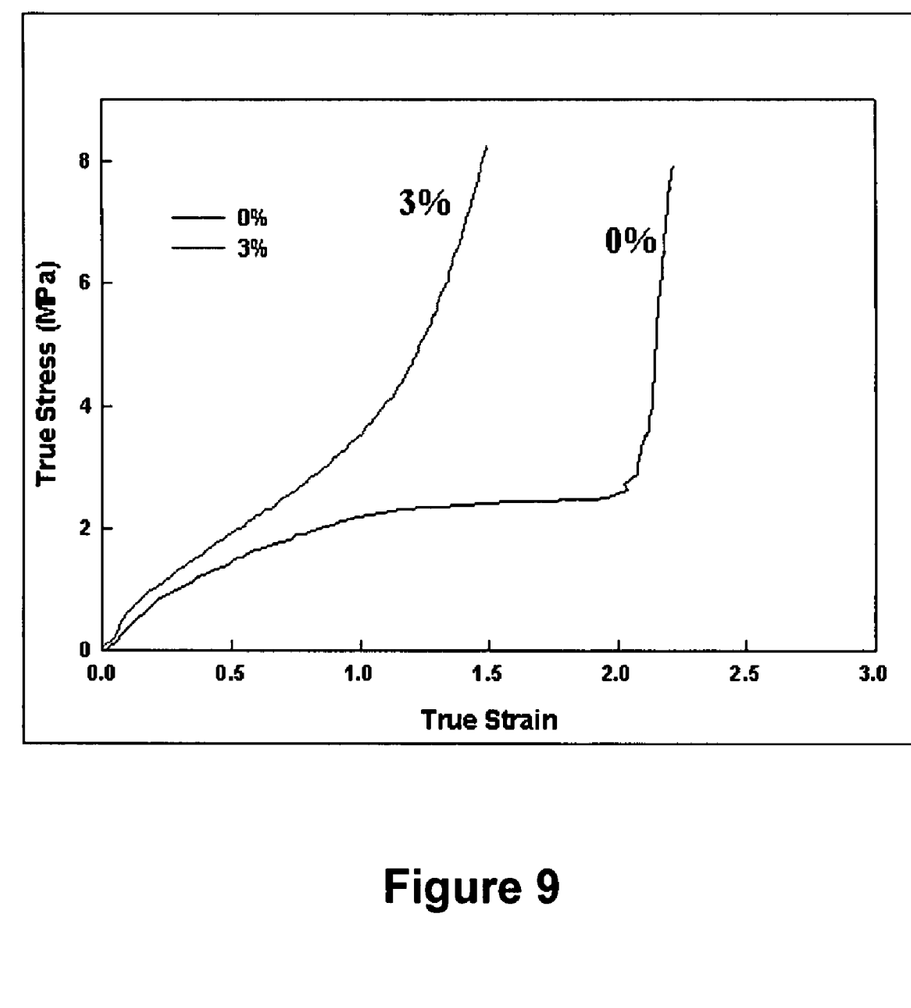
FIG. 9 is a graph of the True Stress versus True Strain of extrusion-cast poly(L-lactic acid) films having Montmorillonite clay loadings of 0 and 3% by volume and stretched at 85° C. and at 500% per minute.

As seen in the birefringence—true stress behavior of extrusion-cast stretched at lower rates, FIG. 9 shows that there is a significant difference between the initial Stress Optical Rule behavior of the filled and unfilled systems, while continuing the trend that this difference becomes greater with increased stretching rate. While there is a slight positive deviation from linearity in the unfilled system, the nanocomposite clearly shows negative deviation from Stress Optical Rule linearity, continuing the trend that nanoparticle loading results in hindered strain-induced crystallization and a higher tendency toward non-Gaussian chain behavior. This higher tendency toward non-Gaussian chain behavior could either be due to the non-Gaussian segment distribution introduced by the nanoclay sheets acting as infinitely long, infinitely stiff chains, or by the nanoclay sheets facilitating chain orientation while acting as a steric or electrical polarization barrier to the formation of a crystalline phase.

Figure 10:
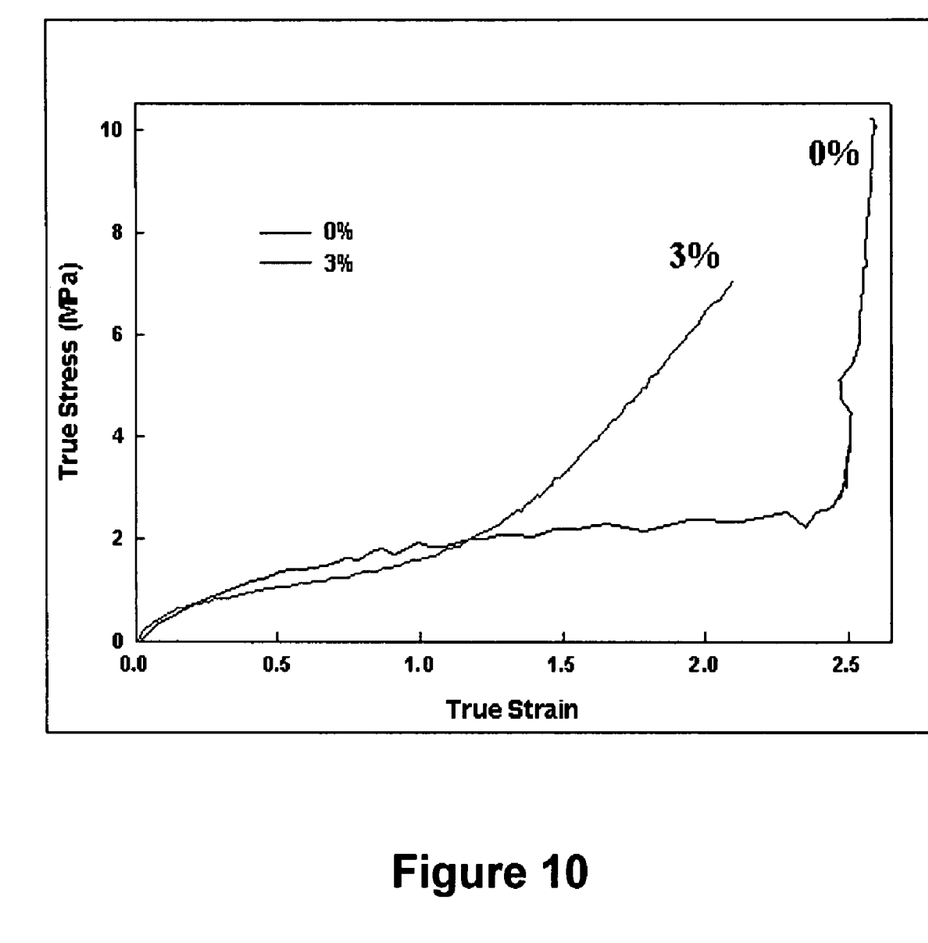
FIG. 10 is a graph of the True Stress versus True Strain of extrusion-cast poly(L-lactic acid) films having Montmorillonite clay loadings of 0 and 3% by volume and stretched at 95° C. and at 500% per minute.

The true mechanical data for extrusion-cast PLA and PLA nanocomposite films stretched to SR 5 at 500% and at temperatures 85 and 95° C. is shown in FIG. 10. There is also a trend that as stretching temperature increases, the strain hardening point shifts to higher true strain. The birefringence—true stress data shows that as temperature increases, there is an increasing difference between the ultimate birefringence values of filled and unfilled systems. As in the case of films stretched at lower rates, films stretched at higher temperatures produce more similarity between the initial linear portions of the curves for filled and unfilled systems. The trend also continues that the slope of the second regime is lower for the filled system than for the unfilled system, once again indicating that strain-induced crystallization is suppressed by the addition of nanoclay.

Figure 11:
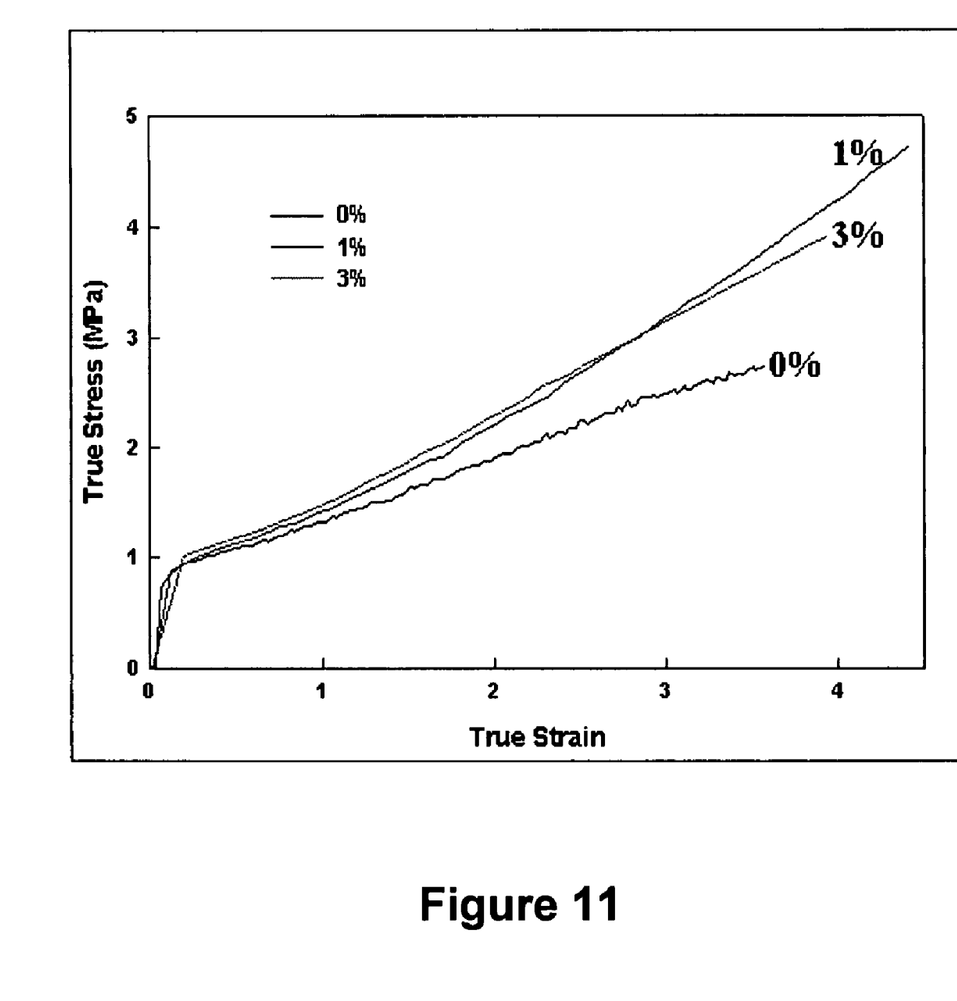
FIG. 11 is a graph of the True Stress versus True Strain of compression-molded polystyrene films having Montmorillonite clay loadings of 0, 1 and 3% by volume and stretched at 115° C. and at 1000% per minute.

The true stress—true strain data for compression molded a-PS (atactic polystyrene) films with clay loadings of 0, 1, and 3% by volume, stretched at 1000%/min and 115° C. are shown in FIG. 11. Although strain hardening is not as clearly seen in a-PS as it is in PLA, it is clear that the addition of clay nanoparticles alone results in strain hardening. This very clearly illustrates that strain hardening is induced by the addition of nanoparticles, as it does not even occur in the unfilled system, while it clearly occurs in the films loaded with both 1 and 3% by volume nanoclay. Due to the relatively large thickness (>1 mm) of these films and high rates of stretching, only a limited amount of coherent birefringence data could be collected.

It is clear that the addition of nanoparticles improves the strain hardening of polymer films by lowering the true strain value at which strain hardening occurs. This will lead to films with higher integrity and more even properties. Not only can strain hardening in the rubbery be lowered significantly by the addition of nanoparticles, but the strain hardening point can be easily controlled by slight changes in the composition of the blend, and great improvement can be achieved at the addition of only 1% by volume. This not only allows for adaptation of a new material to an existing process, but that material will retain the light weight of being a plastic, while gaining the end-use property enhancement that has been shown for nanocomposites in such processes as injection molding.

Clearly, the process enhancement provided by nanoparticle loading is not limited to slow crystallizing materials. The property enhancement seen in non-crystallizable a-PS shows that, in general, an essentially amorphous precursor system loaded with nanoparticles can have improved strain-hardening properties, when film is produced from this system and stretched in the rubbery state.

Figure 12A:
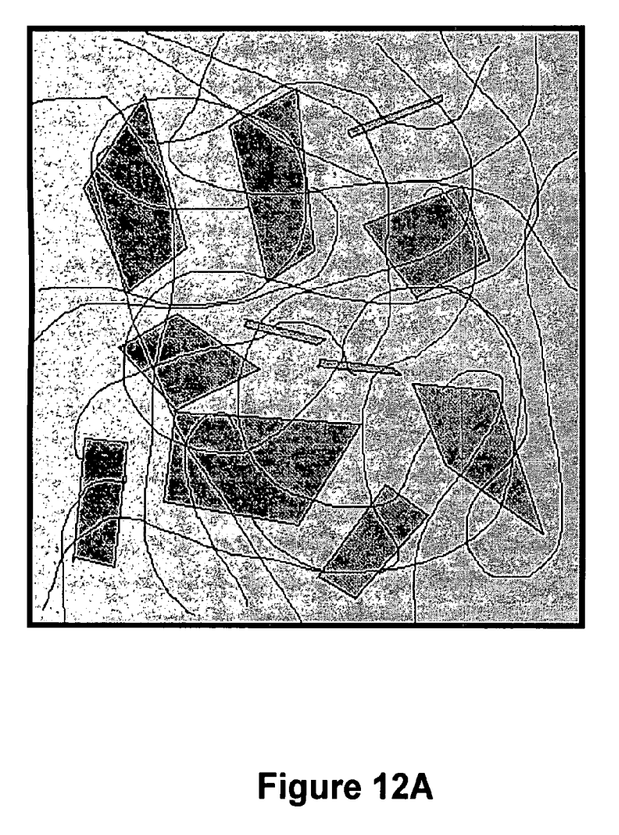
FIGS. 12A and 12B are schematic representations of an as-cast (underformed) nanocomposite film and a deformed (axially drawn) nanocomposite film.
Figure 12B:
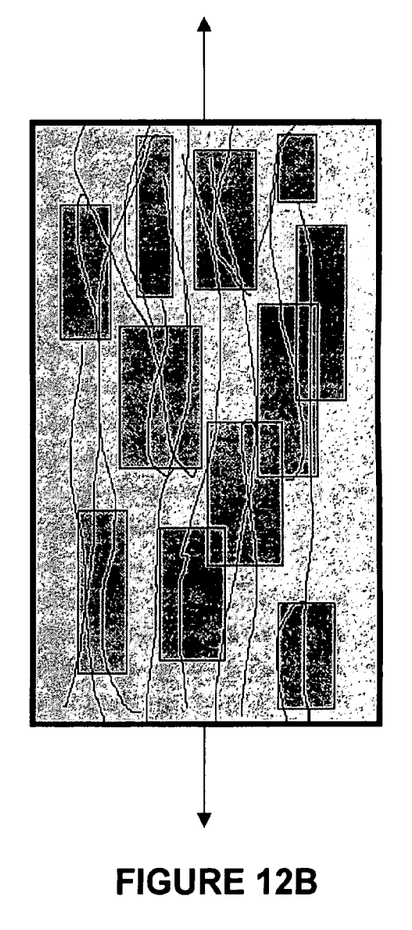

Extrusion-cast films perform better than compression-molded films due to the "pre-orientation" of the nanoclay sheets induced by the process. This leads to earlier strain hardening, as the sheets will not change their orientation significantly during the early stages of deformation. The generalized mechanism of earlier strain hardening is presented in FIGS. 12A and 12B. The as-cast films is composed of essentially unoriented amorphous polymer chains and nanoclay sheets with varying degrees of intercalation and preferential orientation in the plane of the film (this preferential orientation in the plane of the film is higher in extrusion-cast films). The clay sheets have favorable interaction with the polymer chains, and form relatively strong temporary network junctions with the chains while disturbing chain-chain entanglements. During deformation, the stiff clay sheets feel forces more than the flexible polymer chains, and quickly orient in the direction of deformation. The high stiffness of the clay sheets leads to longer relaxation times, and hinders the relaxation of oriented chains. This leads to earlier onset of strain hardening, as chains reach their maximal extension at lower true strains. This mechanism of increasing the relaxation time is particularly effective at higher temperatures and lower rates, where chain relaxation typically has a greater effect during deformation, as the clay sheets will have a much higher relaxation time than the time of stretching regardless of rate, and are obviously not affected significantly by temperature in the range of temperatures in which stretching is normally performed.

As can be appreciated, the process of the present invention can be use to produce a variety of polymeric objects and products, and so is not limited to the examples of products which are provided. Clearly the production of films is benefited since they will result in uniform thicknesses and improved optical clarity. Such products might include photographic film where the products achieve improved optical clarity and dimensional stability, including an ability of the film to uncurl. But, the process could also be used to make recording tape, or polymers for photonic applications, such as optical retarders, as well as three dimensional objects, such as bottles or containers which would benefit from being strain hardened, dimensional stability, uniform thickness, optical clarity, and/or gas barrier characteristics.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. A process for controlling the strain hardening properties of a polymer comprising:
    blending a polymer and nanoparticles to produce a polymeric composition;
    quenching the polymeric composition at a temperature below the glass transition temperature of the polymer to yield an amorphous polymeric composition;
    forming a film from the amorphous polymeric composition; and
    subjecting the film to strain hardening in a rubbery state by stretching the film at a temperature between the glass transition temperature and the cold crystallization temperature,
    wherein the nanoparticles are present in an effective amount of between 0.01% and 10% by volume based upon the volume of polymer used to form the polymeric composition in order to reduce the true strain at which the film formed from the polymeric composition undergoes strain hardening, wherein the steps of quenching the polymeric composition and the step of forming the film are interchangeable, and wherein the polymer is selected from polystyrene or polylactic acid and the nanoparticles are selected from nanoclays or substituted montmorillonite.

2. The process of claim 1, wherein the nanoparticles are substituted Montmorillonite.

3. The process of claim 1, wherein the nanoparticles are present in an amount of between 0.1% and 10% by volume based upon the volume of polymer used to form the polymeric composition.

4. The process of claim 1, wherein the nanoparticles are present in an amount of between 1% and 10% by volume based upon the volume of polymer used to form the polymeric composition.

5. The process of claim 1, wherein the nanoparticles are present in an amount of less than 5% by volume based upon the volume of polymer used to form the polymeric composition.

6. The process of claim 1, wherein the polymer composition is partially or completely molten when subjected to strain hardening.

* * * * *